United States Patent Office 3,156,431
Patented Nov. 10, 1964

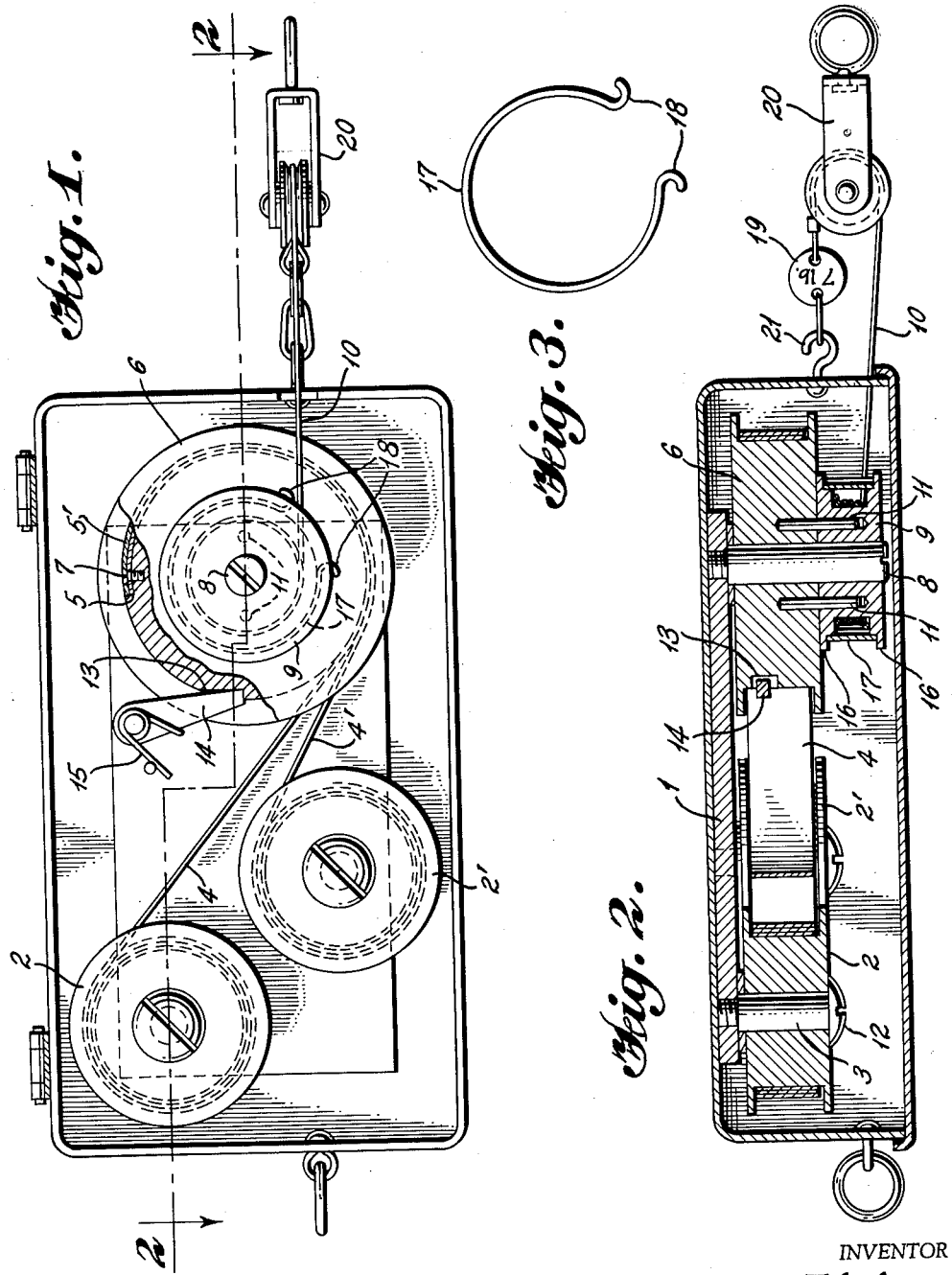

3,156,431
CABLE TENSIONING UNIT
Edwin L. Zivi, Severna Park, Md., assignor to Ametek, Inc., New York, N.Y., a corporation of Delaware
Filed Oct. 26, 1962, Ser. No. 233,374
7 Claims. (Cl. 242—107)

This invention relates to a cable tension motor whereby a cable may be placed under substantially constant tension over its length as it is reeled and unreeled from a cable drum.

A cable tension motor of this invention has application wherever it is necessary to have substantially constant tension on a cable as it is reeled and unreeled from a cable drum such as, for example, in equipment or in connection with tools where it is necessary to counterbalance the weight of a tool or part.

The cable tension motor or traction unit consists essentially of a precoiled spring which normally assumes a coiled position on a take-up drum. Such a spring may be a tightly coiled non-cumulative force spiral spring, for example of the type disclosed in Patent No. 2,609,191 or No. 2,609,192, wound on a drum with its extended portion reverse wound on a drum, as best seen in FIGURE 1 to form what is known as a "B" motor which is disclosed in Fornelius Patent No. 1,977,546. One or more of such springs on the same number of take-up drums have the outer ends secured to what is called an output drum. The output drum causes a reverse coil in the springs and generates a torque in the output drum resulting from the tendency of the springs to assume their normal precoiled position on the take-up drum.

One or more springs may be used depending on the torque required. The several springs from several take-up drums, regardless of the number, are secured at their free ends on the periphery of the output drum.

The combination of a certain size spring, take-up drum and output drum gives a substantially constant torque. This torque cannot be changed without changing one or more of these factors. This is a fact whether one or more take-up drums and springs are used. If there are a plurality of springs secured to the take-up drum, there will be a predetermined amount of torque exerted by the take-up drum or if there is one spring secured to the output drum, there will be a predetermined amount of torque determined by that spring of torque in the output drum.

It is an object of this invention, therefore, to provide apparatus whereby the tension on a cable secured to the output drum can be varied for different uses.

It is another object of this invention to provide means and apparatus for securing several different tensions in a cable or tractions in a cable from a single output drum or cable tension motor unit.

It is another object of this invention to provide apparatus for securing several tensions with great ease of interchangeability from one cable tension to another cable tension in predetermined amounts or increments.

Further and other objects in this invention will be apparent from the description of the accompanying drawing in which like numerals refer to like parts.

In the drawing:
FIGURE 1 shows a plan view of a cable tension motor or traction unit assembly;
FIGURE 2 is a sectional view taken on the line 2—2 of FIGURE 1; and
FIGURE 3 shows a cable drum clip.

FIGURES 1 and 2 show in plan and sectional view a base member 1 on which are mounted one or more spools or drums 2, 2'. Spool 2 is shown mounted by pivot screw 3 to the base member 1 so that spool 2 rotates freely on pivot screw 3. A spring 4 is shown precoiled around the spool or drum 2 in a manner such that, if free, it will coil and assume the coiled position around spool or drum 2. A second spool or drum 2' is provided with a similar spring 4', but it is to be understood that as many spools or drums with as many springs, precoiled in the manner described above may be employed on the one base member depending upon the torque desired in the design. However, one spring may be coiled on one spool to give the equivalent of the plurality of spools with springs.

The free end or ends 5–5' of the spring are wound on the output drum 6 in the reverse direction and the end or ends 5–5' secured at 7 to the periphery of drum 6. Flanges are provided on all of the drums merely for the purpose of keeping the coils of springs aligned. However, flanges are not essential to the operation of the springs on the drums.

It will be noted that the inner end of the spring is not secured on the take-up drum but the outer or free end of the springs is secured to the periphery of the output drum at 7. The output drum is mounted in a similar manner on a post 8 that is secured to the base member 1 so that the axes of the drums 2 and 6 will be parallel to insure proper coiling of the springs.

Another spool or drum 9 is provided, mounted on shaft 8, to turn with output drum 6. As cable 10 is pulled from cable drum 9 by reason of an interlocking fastening such as a plurality of pins 11 extending between output drum 6 and cable drum 9, the unreeling of cable 10 from cable drum 9 causes the output drum 6 to rotate and thus unreel the spring 4 from the take-up drum 2 onto the periphery of output drum 6. The tendency of the spring 4 to assume its precoiled position on the take-up drum 2, exerts a torque on the output drum 6 which is transmitted to the cable drum 9 such that the tension in the cable 10 as it is pulled or unreeled from the cable drum 9 is substantially constant for any length of extension of a cable from the cable drum.

It will be noted that all of the drums are free to move on their securing posts 3 and 8. However, the post 3 retaining the take-up drum 2 has a head 12 on it to keep drum 2 from slipping off the base mount. The cable drum 9 slides over the post 8 on which the output drum 6 is mounted with a sliding fit for easy removability. Two pins 11 are secured in the output drum 6 and extend into the cable drum 9 with a sliding fit. While pins 11 are shown to transmit torque from the cable drum 9 to the output drum 6, it is to be understood that any type of removable or easily engageable fastening may be employed to secure the cable drum to the output drum.

The output drum 6 has a notch 13 formed in the periphery of the drum and is located at a point trailing the point of attachment 7 of the springs 4 on the drum 6, in the direction of rotation of output drum 6 for reeling of the cable drum 9. A latch 14 and spring 15 are mounted on the base member. Spring 15 biases latch 14 to slide into notch 13 when the ends of the spring exposes the part of the drum wtih the notch. This prevents the output drum 6 from rotating and locks drum 6 while the cable drum 9 is removed and replaced. The latch is lifted out of notch 13 and rides on the spring 4 as cable 10 is unreeled rotating cable drum 9 and output drum 6.

Cable drum 9 has flanges 16 between which the cable is wound and the inner end of the cable is secured to the drum. As the cable is pulled off of the cable drum or unreeled, the torque is transmitted to the output drum 6 by means of the inner locking device 11 referred to above. The cable is pulled out or unreeled and the precoiled spring pulled from the take-up drums 2, 2' and wound on the output drum 6. As mentioned above the tendency of the precoiled spring 4 to return to the take-up drum keeps the cable under tension for all extensions of the cable from the cable drum.

A clip 17 shown in FIGURE 3 loosely surrounds the cable 10 on the drum 9 between the flanges 16 or it may ride loosely in grooves in the flanges and has the end 18 thereof curved so as to be moved easily by reeling or unreeling of the cable. This retains the reeled cable on the cable drum when cable drum 9 is removed from the motor unit.

The sliding fit of cable drum 9 on post 8 on which output drum 6 is mounted and the inner engaging means 11 between output drum 6 and cable drum 9 permits one cable drum to be removed and another of a different diameter placed on post 8 to engage output drum 6 for a different tension. The tension for the same spring means will vary in proportion to the diameter of cable drum 9. For any particular motor or unit the spring arrangement will be constant.

Cable drums form labelled units. Each cable drum 9 has a cable 10 extending therefrom and retained on the cable drum by a clip 17. A tag 19 on each cable shows the amount of tension or pull that will be exerted by the cable when mounted on a particular motor unit with a particular predetermined spring arrangement. If it is desired, a simple single sheave pulley 20 can be employed and the end of the cable placed on a hook 21 and the pull of any particular cable can be doubled.

I claim:

1. A cable tensioning unit comprising a base member, spring means precoiled to a predetermined diameter, a take-up drum means on which said spring means normally assumes the precoiled position, said take-up drum means mounted for rotation with respect to said base member, an output drum means to which the outer end of said spring means is secured, a cable drum means removably secured to and mounted to turn concentrically with said output drum means, said output drum means being mounted on a shaft secured to said base member and having the axis thereof parallel with the axis of said take-up drum means, latch means to stop rotation of said output drum means at a predetermined point of rewind, said latch means being moved into an inoperative position upon reverse direction of rotation by said output drum means being moved by said cable drum means.

2. The cable tensioning unit as claimed in claim 1 in which interlocking means are provided between said output drum means and said cable drum means whereby said cable drum means can be removed from said output drum means.

3. The cable tensioning unit as claimed in claim 1 in which axially extending interlocking means are provided between said output drum means and said cable drum means, whereby said cable drum means can be removed axially from said output drum means.

4. The cable tensioning unit as claimed in claim 1 in which said cable drum means is surrounded by a member extending over the cable on said cable drum means to retain the cable when wound on said drum means, said member having an aperture formed therein in the periphery thereof to pass the cable as it is reeled and unreeled from said cable drum means.

5. The cable tensioning unit as claimed in claim 4 in which the cable drum means is formed with flange means, and the member is formed to be mounted on said flange means while moving around the periphery of said cable drum means.

6. The cable tensioning unit as claimed in claim 1 in which bias means hold the latch means against the periphery of the output drum means, and a notch means is formed in the periphery of said output drum means adjacent the point of attachment of the spring means to said output drum means which is covered by said spring means as movement of said cable drum means turns said output drum means to wind said spring means on said output drum means, but is uncovered to permit locking of said latch means in said notch means after the end of said spring means passes under said latch means.

7. A cable tensioning unit comprising a base member, spring means precoiled to a predetermined diameter, a take-up drum means on which said spring means normally assumes the precoiled position, said take-up drum means mounted for rotation with respect to said base member, an output drum means to which the outer end of said spring means is secured, a cable drum means removably secured to and mounted to turn concentrically with said output drum means, said output drum means being mounted on a shaft secured to said base member and having the axis thereof parallel with the axis of said take-up drum means, and means to stop rotation of said output drum means at a predetermined point of rewind.

References Cited by the Examiner

UNITED STATES PATENTS

| 458,938 | 9/91 | Bloomfield | 242—107 |
|---|---|---|---|
| 1,468,636 | 9/23 | Hoeft | 206—53 |
| 2,400,589 | 5/46 | McArthur | 242—107.4 |
| 2,673,694 | 3/54 | Howell | 242—107.3 |
| 2,928,538 | 3/60 | Mills | 206—53 |
| 3,061,234 | 10/62 | Morey | 242—107.1 |
| 3,085,768 | 4/63 | Treutelaar | 242—107 |

MERVIN STEIN, *Primary Examiner.*